(12) United States Patent
Li

(10) Patent No.: US 7,467,584 B2
(45) Date of Patent: Dec. 23, 2008

(54) ROASTING MACHINE

(75) Inventor: Jian Li, Guandong (CN)

(73) Assignee: Guangzhou Light Holdings Limited, Guangdong (CN)

( * ) Notice: Subject to any disclaimer, the term of this patent is extended or adjusted under 35 U.S.C. 154(b) by 0 days.

(21) Appl. No.: 11/737,344

(22) Filed: Apr. 19, 2007

(65) Prior Publication Data

US 2007/0186787 A1    Aug. 16, 2007

(51) Int. Cl.
*A47J 37/00*    (2006.01)

(52) U.S. Cl. .............................. 99/331; 99/339; 99/340; 99/441; 219/388

(58) Field of Classification Search ........... 99/444–450, 99/419–421 V, 483, 440, 441, 389–393, 443 R, 99/443 C, 326–333, 339, 340; 126/25 R, 126/41 R, 41 A, 41 B; 220/543–546, 529, 220/533; 219/400, 494, 497, 499, 388, 386, 219/401, 411

See application file for complete search history.

(56) References Cited

U.S. PATENT DOCUMENTS

| | | | |
|---|---|---|---|
| 4,370,920 A | | 2/1983 | Henriques et al. |
| 4,373,431 A | | 2/1983 | Wallick et al. |
| 6,354,193 B1 | | 3/2002 | Lee |
| 6,393,971 B1 * | | 5/2002 | Hunot et al. ................... 99/341 |
| 6,659,574 B2 * | | 12/2003 | Huegerich .................... 312/137 |
| 6,707,015 B2 * | | 3/2004 | Huegerich et al. ........... 219/494 |
| 7,143,687 B2 * | | 12/2006 | Pearlman et al. ............... 99/441 |
| 7,334,517 B2 * | | 2/2008 | Gaskill et al. .................. 99/339 |

FOREIGN PATENT DOCUMENTS

| | | |
|---|---|---|
| CN | Y-2209921 | 10/1995 |
| CN | Y-2278354 | 4/1998 |
| CN | Y-2424724 | 3/2001 |
| CN | Y-2469857 | 1/2002 |
| CN | Y-2552349 | 5/2003 |

OTHER PUBLICATIONS

International Preliminary Search Report (in Chinese).
International Preliminary Search Report.

* cited by examiner

*Primary Examiner*—Timothy F. Simone
(74) *Attorney, Agent, or Firm*—Greenberg Traurig, LLP

(57) ABSTRACT

The present invention generally provides a roasting machine, which can roast both the food that needs to be rotated upon roasting and the food that does not need to be rotated while roasting. The roasting machine is provided with a housing for supporting and protecting a roasting cab and roasting pipes, a roasting plate for baking and heating various food which does not need to be rotated, roasting pipes for baking and heating various food which needs to be rotated continuously so that they can be uniformly heated, and a drive unit used to drive the roasting pipes to rotate. The roasting machine can be used to bake two kinds of food. As the roasting plate is removable, food which does not need to be rotated can be roasted when the roasting plate is placed over the roasting pipes, and the roasting pipes can be used to heat food which needs to be rotated so as to be heated, such as sausages when the roasting plate is removed.

5 Claims, 4 Drawing Sheets

ROASTING MACHINE

This application claims priority from PCT application No. PCT/CN2005/000185 filed Feb. 7, 2005, which claims priority from Chinese patent application 200420074197.5 filed Sep. 27,2004. Both applications are incorporated herein by reference in their entirety.

TECHNICAL FIELD

The present invention relates to a roasting machine, more particularly to a household multi-functional roasting machine.

BACKGROUND ART

With speed-up cadences of daily life, those machines which allow food to be roasted conveniently and rapidly become much more popular than ever before. There are a large number of roasting machines available at present. However, as they all involve a fixed manner in which food can be roasted, these roasting machines with a single function are inconvenient in use. For example, some of the machines can only be used to roast food which does not need to be rotated and some, on the other hand, can only be used to roast food which needs to be rotated continuously, thus one kind of the machines can only be used to roast only either kind of the food and it is impossible to have both kinds of food be roasted by a same kind of machine, being rather inconvenient.

SUMMARY OF THE INVENTION

The present invention generally provides a roasting machine, which can roast both the food that needs to be rotated upon roasting and the food that does not need to be rotated while roasting. The roasting machine is provided with a housing for supporting and protecting a roasting cab and roasting pipes, a roasting plate for baking and heating various food which does not need to be rotated, roasting pipes for baking and heating various food which needs to be rotated continuously so that they can be uniformly heated, and a drive unit used to drive the roasting pipes to rotate. The roasting machine can be used to bake two kinds of different food. As the roasting plate is removable, food which does not need to be rotated can be roasted when the roasting plate is placed on the roasting pipes and the roasting pipes can be used to heat food which needs to be rotated so as to be heated, such as sausages when the roasting plate is removed. In order to control a roasting effect on different food, two or more than two controllers can be used to control temperature and period of time for different roasting pipes and the roasting cab, so as to allow various food to be roasted more conveniently.

DETAILED DESCRIPTION OF PREFERRED EMBODIMENTS

Figure 1:
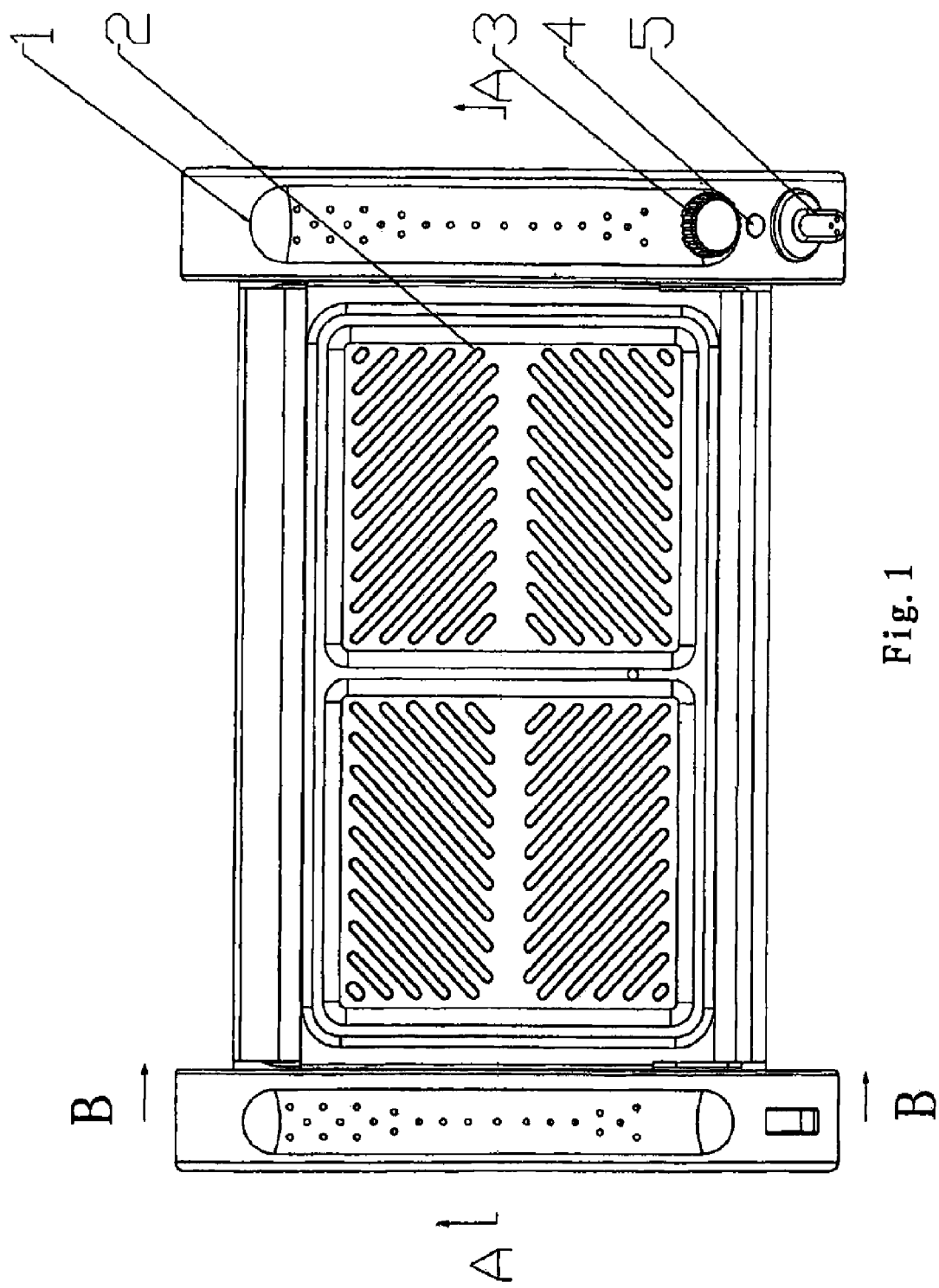
FIG. 1 shows a front view of an embodiment according to the present invention.
Figure 2:
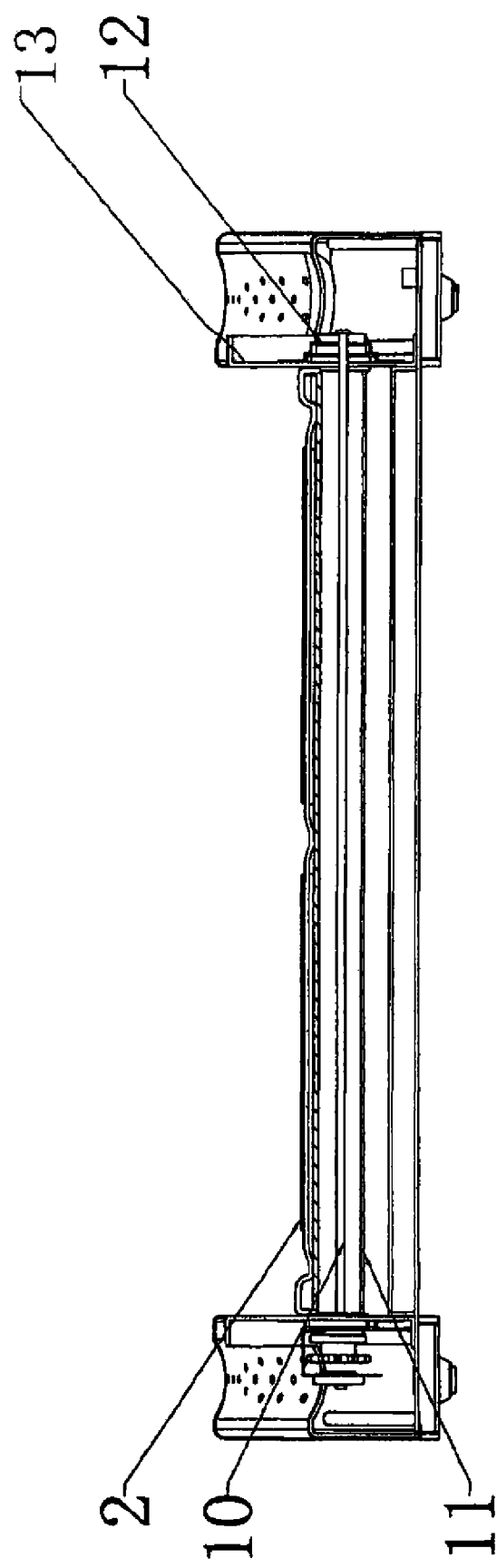
FIG. 2 shows a sectional view taken along the line A-A of FIG. 1.
Figure 3:
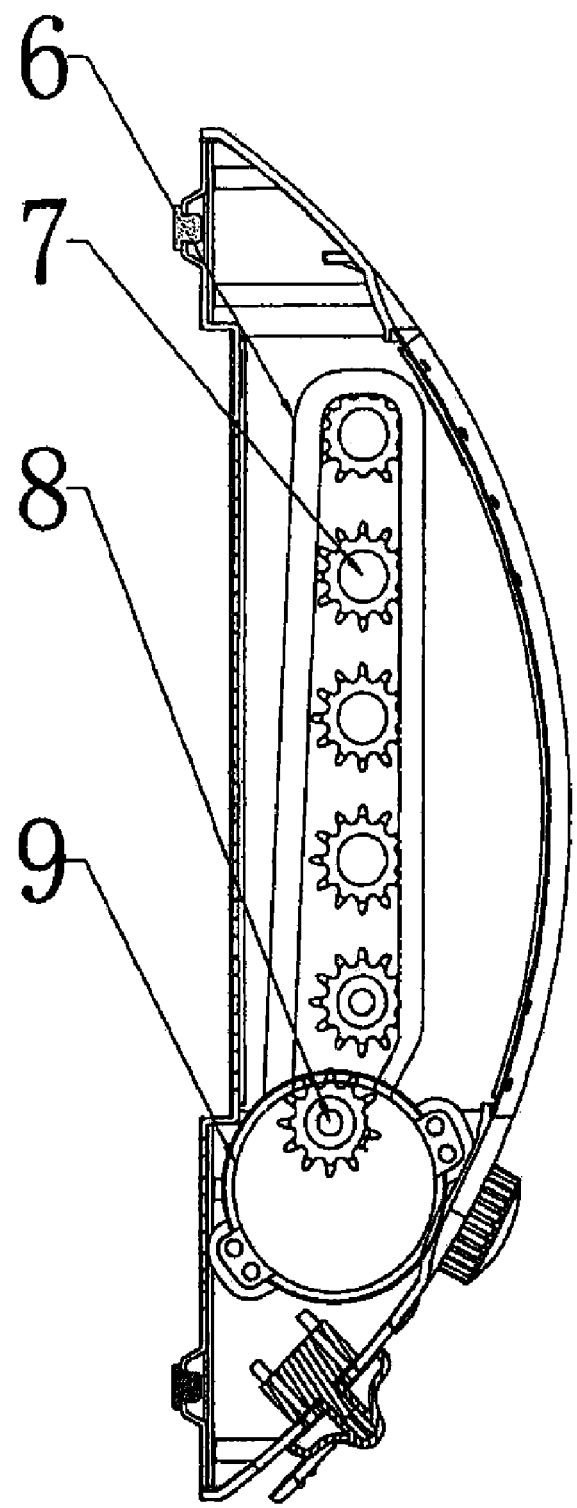
FIG. 3 shows a sectional view taken along the line B-B of FIG. 1.
Figure 4:
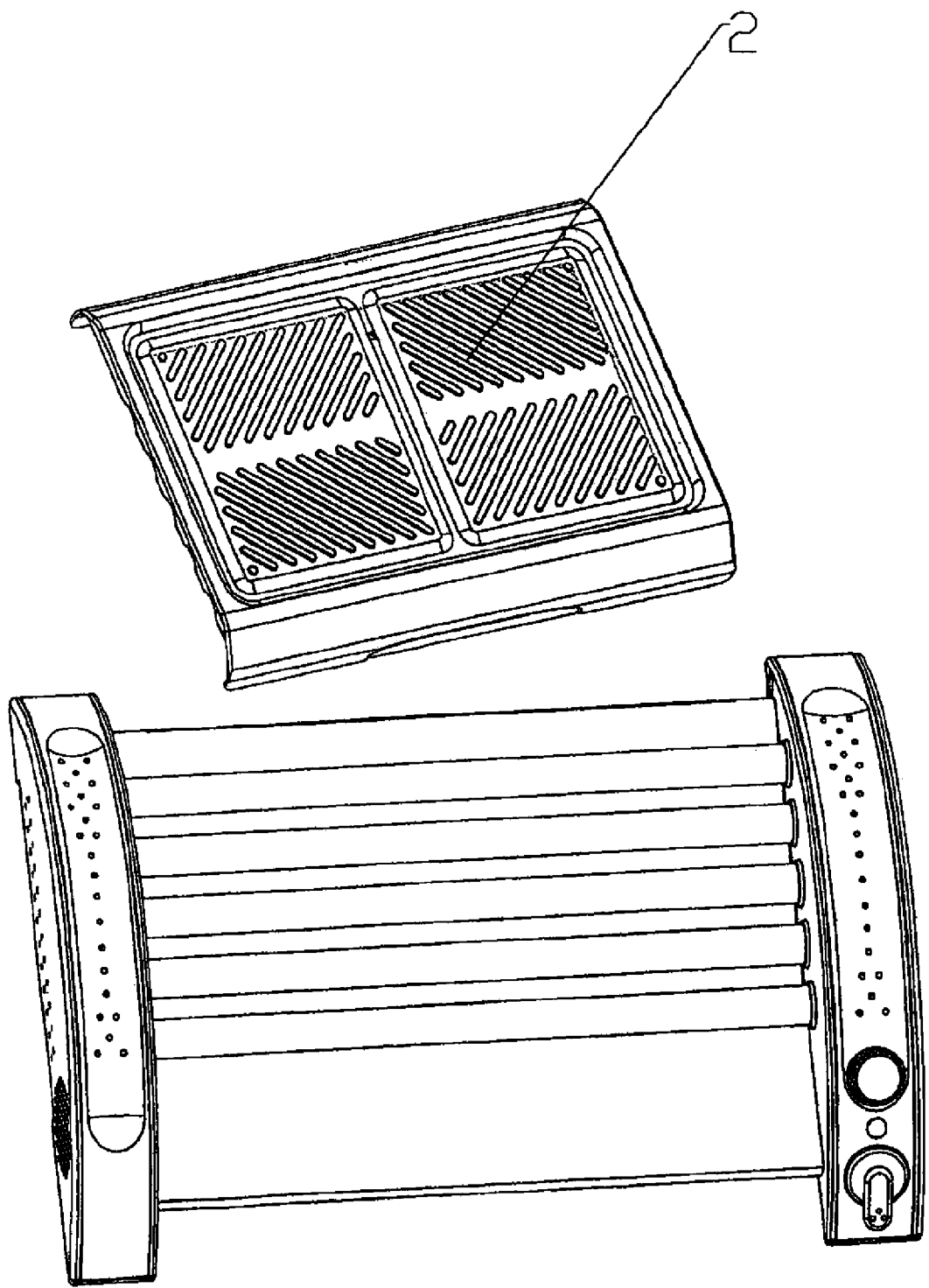
FIG. 4 shows a side view of an embodiment according to the present invention.

Referring to the figures, the parts represented by reference numerals are named as follows:
1. outer casing
2. roasting plate
3. temperature control unit
4. indicator light
5. on-off element
6. chain
7. driven gear
8. drive gear
9. electric motor
10. roasting pipe
11. heating pipe
12. sleeve (for supporting the roasting pipe)
13. support The housing is formed by an outer casing (1) and a support (13), the outer casing (1) is a hardware piece similar to a triangle in shape, having a groove on each side for mounting the support (13). The outer casing has three holes on a right side of a front thereof for mounting a indicator light (4), a temperature control unit (3) and an on-off element (5). The support (13) is a hardware support in shape of a letter "H", an upper portion of which is provided on each side symmetrically with five holes for mounting the roasting pipes (10). A heating pipe (11) is disposed at the middle of the roasting pipes and the roasting pipes are heated upon working of the heating pipe (11) so as to roast food. The support (13) is mounted by itself to the outer casing (1) so as to be fixed there. An electric motor (9) is mounted fixedly to the middle of the support (13) by means of screws.

The roasting pipe (10) is a hollow pipe made of aluminum, or iron or stainless steel, which is mounted rotatably in the holes of the support (13) by means of a sleeve (12), with one end of the roasting pipe fixed with a driven gear (7). A drive gear (8) is secured by means of screws to an output shaft of the electric motor (9). Through a chain (6), rotation of the electric motor drives the driven gear (7) to rotate, which, in return, drives the routing pipes (10) to rotate so as to heat the food uniformly.

For heating food which does not need to be rotated, an on-off element (5) is switched to another shifting position to stop the rotation of the electric motor (9) and thus stopping the rotation of the roasting pipes. The roasting plate (2) is placed onto the roasting pipes (10); upon working of the heating pipe (11), the roasting pipes will be heated, which will then heat the roasting plate (2) so as to heat the food thereon.

What is claimed is:

1. A roasting machine comprising a housing, a support, heating pipes, a drive unit and a temperature control unit, further comprising:
   a. a plurality of rotatable roasting pipes into which the heating pipes are placed and which are rotatably mounted to the support;
   b. a removable roasting plate; and
   c. a switch that has a plurality of shifting positions, such that when said switch is switched to first shifting position the plurality of roasting pipes rotate and the heating pipes do not generate heat.

2. The roasting machine according to claim 1, wherein when said switch is switched to a second shifting position, the plurality of roasting pipes do not rotate and the heating pipes do generate heat so that food which does not need rotary roast can be roasted after putting the roasting plate in place.

3. The roasting machine according to claim 1, wherein when said switch is switched to a third shifting position, the plurality of roasting pipes rotate and the hearing pipes heat, so that food which needs rotary roasting can be so roasted once the roasting plate is removed.

4. The roasting machine according to claim 1, wherein said roasting plate is made of aluminum, iron or steel.

5. The roasting machine according to claim 1, wherein:
a. The plurality of roasting pipes comprise hollow pipes made of aluminum, iron or steel, which are mounted rotatably in holes in the support, with one end of each roasting pipe fixed to a driven gear;
b. a drive gear secured to an output shaft of an electric motor and through a chain, said chain also engaging the driven gears for each roasting pipe; such that rotation of the electric motor drives the driven gear via the drive gear and the chain causing the driven gear to rotate, thus causing the roasting pipes to rotate.

\* \* \* \* \*